(12) United States Patent
Radeljak et al.

(10) Patent No.: US 9,777,590 B2
(45) Date of Patent: Oct. 3, 2017

(54) INSTRUMENTED VANE

(71) Applicant: SNECMA, Paris (FR)

(72) Inventors: Gabrijel Radeljak, Torcy (FR);
Sebastien Hameau, Lieusaint (FR);
Antoine Jean Jausovec, Tournan en Brie (FR); Frederic Raymond Jean Miroudot, Bry sur Marne (FR);
Mathilde Blandin, Gaillon (FR);
Marcel Bussard, Blaru (FR)

(73) Assignee: SNECMA, Paris (FR)

( * ) Notice: Subject to any disclaimer, the term of this patent is extended or adjusted under 35 U.S.C. 154(b) by 319 days.

(21) Appl. No.: 14/615,882

(22) Filed: Feb. 6, 2015

(65) Prior Publication Data
US 2015/0226082 A1 Aug. 13, 2015

(30) Foreign Application Priority Data

Feb. 7, 2014 (FR) .................................... 14 50960

(51) Int. Cl.
*F01D 21/00* (2006.01)
*F01D 17/08* (2006.01)
(Continued)

(52) U.S. Cl.
CPC ............. *F01D 21/003* (2013.01); *F01D 9/02* (2013.01); *F01D 17/08* (2013.01); *F01D 17/085* (2013.01);
(Continued)

(58) Field of Classification Search
CPC ........ F01D 17/02; F01D 17/08; F01D 17/085; F05D 2270/312
(Continued)

(56) References Cited

U.S. PATENT DOCUMENTS

| 4,595,298 A * | 6/1986 | Frederick | G01K 13/02 |
| | | | 374/144 |
| 6,062,811 A * | 5/2000 | Zombo | F01D 5/187 |
| | | | 340/449 |

(Continued)

FOREIGN PATENT DOCUMENTS

| EP | 1 770 245 A1 | 4/2007 |
| FR | 2 952 713 A1 | 5/2011 |
| GB | 2452026 A9 | 2/2009 |

OTHER PUBLICATIONS

French Preliminary Search Report and Written Opinion dated Nov. 18, 2014, in Patent Application No. FR 1450960, filed Feb. 7, 2014 (with English Translation of Category of Cited Documents).

*Primary Examiner* — Mary McManmon
*Assistant Examiner* — Richard K Durden
(74) *Attorney, Agent, or Firm* — Oblon, McClelland, Maier & Neustadt, L.L.P.

(57) ABSTRACT

A vane intended to be mounted in a supply fluid pattern, includes a blade delimited in a lateral direction by an outer surface, the blade housing a data routing channel and having a groove leading to the outer surface and which communicates with the data routing channel, and data collecting means for collecting data on one of the outer surface of the blade and the vicinity thereof, the data collecting means being connected, through the groove, to the data routing channel, or extending there through. The data collecting means include one of an inserted tube and a cable, and the groove is formed in one of the outer surface opposite that whereto the inserted tube and the cable leads, and the blade that includes an orifice passing therethrough the outer surface.

9 Claims, 3 Drawing Sheets

(51) Int. Cl.
*F01D 9/02* (2006.01)
*G01M 15/02* (2006.01)

(52) U.S. Cl.
CPC ...... *F05D 2230/13* (2013.01); *F05D 2260/80* (2013.01); *F05D 2260/83* (2013.01); *G01M 15/02* (2013.01)

(58) Field of Classification Search
USPC ........................................................ 415/118
See application file for complete search history.

(56) References Cited

U.S. PATENT DOCUMENTS

| | | | | |
|---|---|---|---|---|
| 7,056,085 | B2 * | 6/2006 | Ponziani | G01F 1/684 |
| | | | | 415/118 |
| 7,368,827 | B2 * | 5/2008 | Kulkarni | F01D 15/10 |
| | | | | 290/52 |
| 8,011,251 | B1 * | 9/2011 | Snider | G01F 1/40 |
| | | | | 73/714 |
| 8,297,136 | B2 * | 10/2012 | Martindale | F01D 21/003 |
| | | | | 73/866.5 |
| 8,500,402 | B2 * | 8/2013 | Wobben | G01W 1/00 |
| | | | | 415/118 |
| 8,647,066 | B2 * | 2/2014 | Guimbard | F01D 5/143 |
| | | | | 416/193 A |
| 2005/0274178 | A1 * | 12/2005 | Shin | F01D 21/003 |
| | | | | 73/170.14 |
| 2006/0056960 | A1 | 3/2006 | Sabol et al. | |
| 2011/0081229 | A1 * | 4/2011 | Kottilingam | B23K 26/0626 |
| | | | | 415/118 |
| 2015/0110602 | A1 * | 4/2015 | Radeljak | F01D 17/02 |
| | | | | 415/118 |
| 2015/0322813 | A1 * | 11/2015 | Tralshawala | F01D 17/04 |
| | | | | 415/118 |
| 2016/0348531 | A1 * | 12/2016 | Rice | F01D 17/08 |

* cited by examiner

INSTRUMENTED VANE

The invention relates to a vane for a test module in a turbine engine or a complete turbine engine, such as, in particular, an airplane jet turbine engine, or for a compressor or a turbine, and to a method for producing such vane.

An airplane jet turbine engine generally comprises a gas flow annular pattern globally extending around and along a main axis of the turbine engine, wherein gas circulates from the upstream to the downstream direction in the turbine engine. The stages provided in the compressor and the turbine each comprise annular rows of fixed vanes, also called downstream guide vanes or upstream guide vanes respectively, and directing the air (gas) flow toward annular downstream rows of rotating vanes. Each vane comprises a blade extending radially to this axis, through the gas flow pattern of the turbine engine.

In order to meet the needs for collecting data on the internal aerodynamic operation of the turbine engine, sensors or "data collecting means" often have to be positioned on the vane blades.

In this context, and as the performance criteria become more and more important, the blades are always thinner. As the quality of the aerodynamics around the profiles is strongly connected to the presence or the absence of separation, more particularly in the vicinity of the trailing edge, this results in a need to know the static pressure in this area, specifically for a curvilinear abscissa greater than or equal to about 80%, within 15% (0%=leading edge, 100%=trailing edge).

To the applicant's knowledge, the measuring tap (with the data collecting means) is currently often positioned close to the maximum thickness area of the blade profile, considering the existing constraints, among which the following ones can be cited:
  disturbances in the air flow, if the data collecting means (such as a tube for a pressure tap) is routed as an overthickness along a part of the blade,
  a significant impact on the parts production cycle, if the above-mentioned tube is routed in a groove provided in the blade,
  a limitation to thick blade profiles, if routing the measuring tap (collected data) directly in a pre-punched part, or a part which might be produced using a laser melting method (layer by layer construction) is considered.

The present invention provides a simple, efficient and economical solution to all or part of such problems.

For this purpose, it provides for a vane to be mounted in a supply fluid pattern (also called "gas flow pattern") and comprising (as disclosed in GB 2452 026):
  a blade delimited in a lateral direction by an outer surface having an upper surface and a lower surface which are joined at ends, so as to form there a leading edge and a trailing edge respectively, the blade housing a channel for routing data and having a groove leading to at least one of the upper surface and lower surface walls and which communicates with the data routing channel, and
  data collecting means for collecting data on one of the outer surface of the blade and the close vicinity thereof, the data collecting means being connected, through the groove, to the data routing channel, or extending therethrough,
such a vane further having some specific characteristics as follows:
  the data collecting means comprises an inserted tube or cable, and the groove is formed in one of the upper surface or lower surface wall opposite that whereto said tube or cable leads to be able to collect data on one of the outer surface of the blade and the close vicinity thereof,
  and the blade wherein the blade comprises an orifice passing therethrough between the upper surface wall and the lower surface wall, so that said one of the inserted tube or cable extends therethrough.

The technical solution provided here thus consists of a hybrid routing advantageously combining the three above-mentioned methods and enabling to position the data collecting means very far back on the inside of the blade profile, and thus close to the trailing edge area, including with very thin blades.

Still to enhance the quality of measurements and further avoid the above-mentioned drawbacks, it is further recommended that:
  said vane should be such that:
    the blade has a thickness which is thicker at the leading edge than at the trailing edge, between the upper surface and lower surface walls, respectively, and
    from the leading edge to the trailing edge, the blade first has the data routing channel and then the groove, and finally said orifice, and/or
  said vane should be such that:
    from the leading edge to the trailing edge, the blade has a camber line, and
    along the camber line of the leading edge, the data collecting means is present on the upper surface or lower surface wall in the third of the camber line which is the closest to the trailing edge.

In a preferred application, thin blades will specifically be concerned, more particularly for data collecting means/blade couples making it possible to use, on blades having a very low thickness, such means with a small section, which all the better enables a measurement in the downstream part of the blade.

One aspect of the solution presented here thus relates to the case:
  where one said tube is present on a blade side where the groove is formed
  and the ratio between the thickness of the blade at the location of the orifice gone through by said tube and the diameter of said tube is smaller than or equal to 1.5, preferably smaller than or equal to 1, and still preferably between 0.4 and 0.8.

And if the data collecting means is thinner than a tube, such as an instrumentation cable, the thickness (e3) of the blade at the place where the orifice is gone through by such data collecting means preferably range from 0.5 cm to 0.8 cm.

Considering the hybrid solution mentioned above, it will further be possible, and it is even recommended, so that the data collection can be reliable, and executed at the better places, while little affecting the environment of the blade, and can be transmitted to an appropriate processing area, far from the vane, and in particular to external means which may interact with a person in charge of the tests or to a control and saving box:
  that the data routing channel, the groove and the orifice should be substantially perpendicular to each other, and/or
  that, on the vane:
    the blade should extend in a direction extending substantially parallel to the leading edge and the trailing edge, and
    the data routing channel globally should extend, in the blade, along such direction of extension, and/or that, on a blade side where the groove is formed, the tube should have two curvatures reciprocal to one another, outside the vane. Aerodynamic disturbances are low, then.

In order to ensure a suitable mechanical behaviour of the tube in the above-mentioned conditions of its utilisation, it is additionally recommended that the tube should be made of inconel and/or that, in the vane, it should be fixed by welding or brazing and by glue or ceramic cement, thus enhancing the expected sealing effect.

In addition to the above-mentioned vane, the invention also relates to a turbine, compressor or module in a turbine engine, insofar as it includes a vane having all or part of the above-mentioned characteristics.

Is also concerned a method for producing such a vane, wherein laser melting is used to produce the vane, and the data collecting means is inserted into and fixed to the vane.

With a channel embedded in the blade, it will not be exposed to the flow circulating around the blade when operated.

Additional details and/or other special features and advantages of the invention will become apparent from reading the description made as a strictly non-limiting example in relation to the appended figures, wherein.

Figure 2:
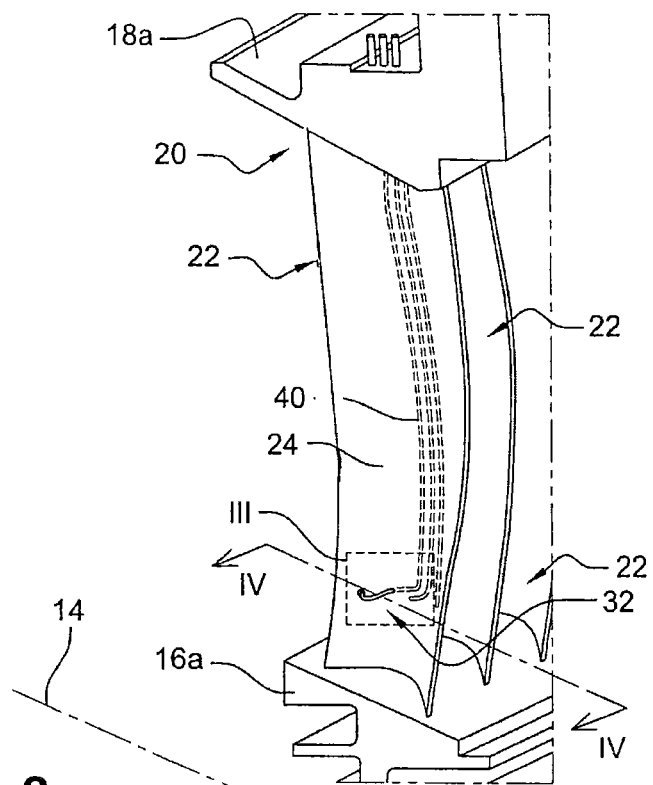
FIG. 2 shows, in perspective, a vane according to the invention.
Figure 3:
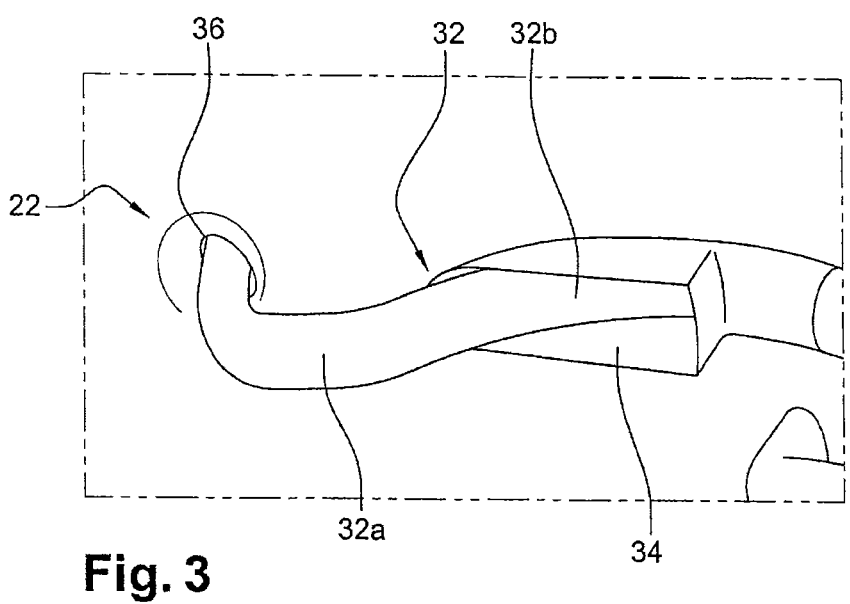
Figure 4:
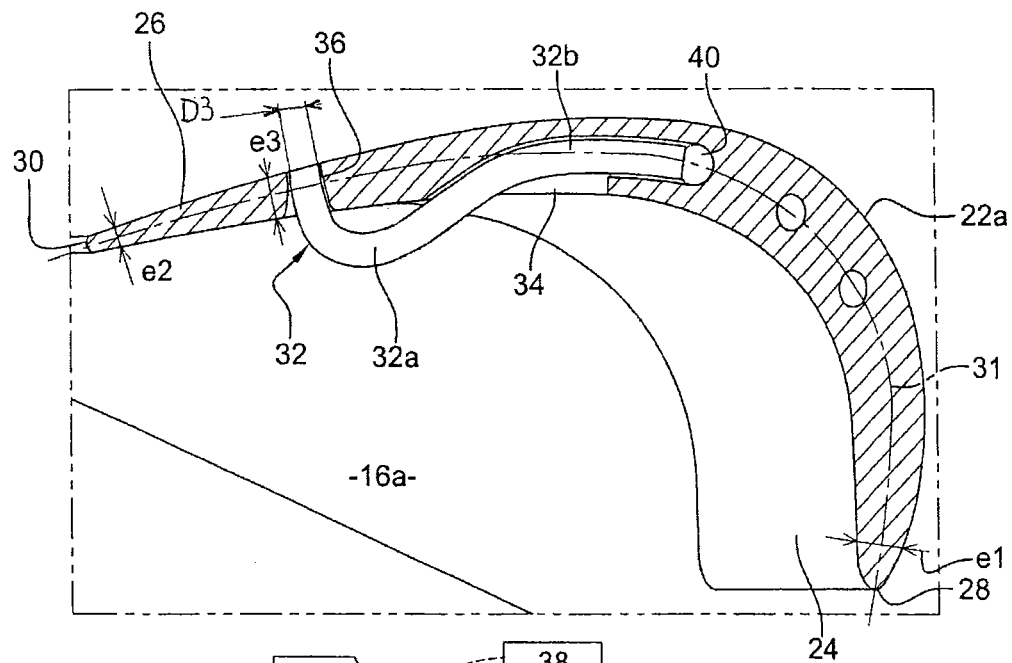
Figure 5:
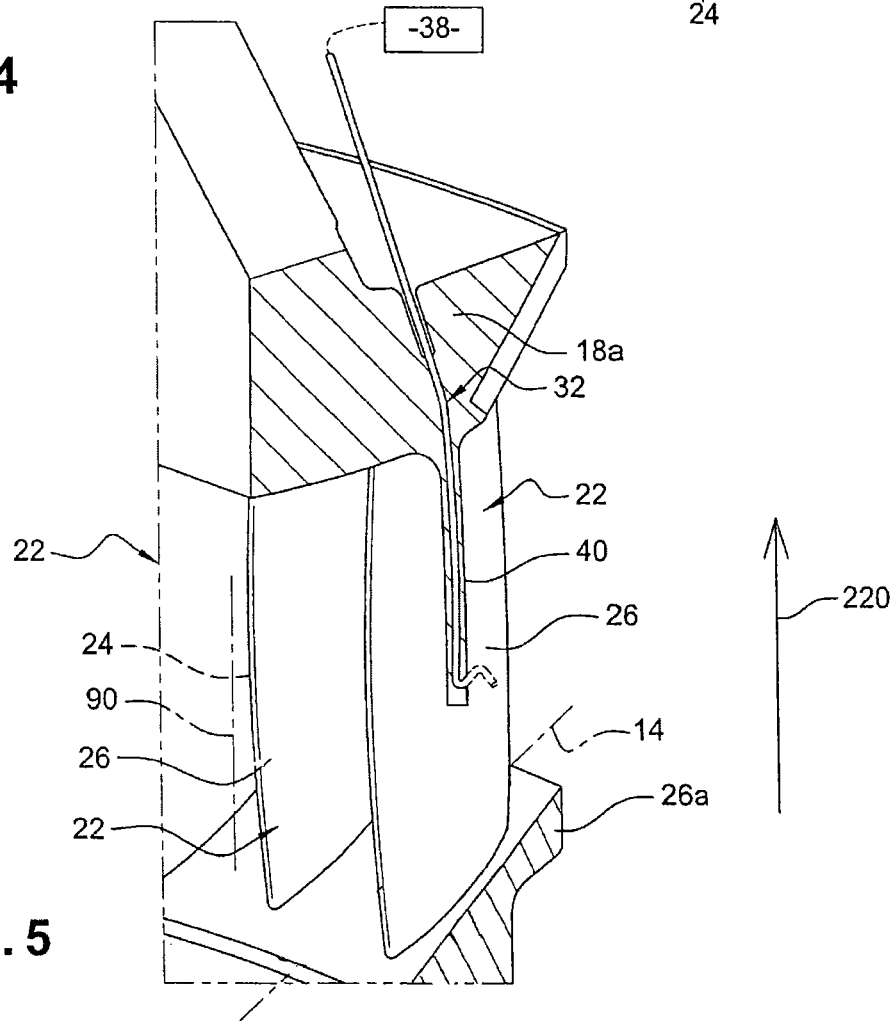

FIG. 3 corresponds to the detail III of FIG. 2;

FIG. 4 corresponds to the IV-IV section of FIG. 2;

and FIG. 5 is another perspective view of a vane according to the invention with an instrumentation cable, instead of the tubes of FIGS. 2-4.

Figure 1:
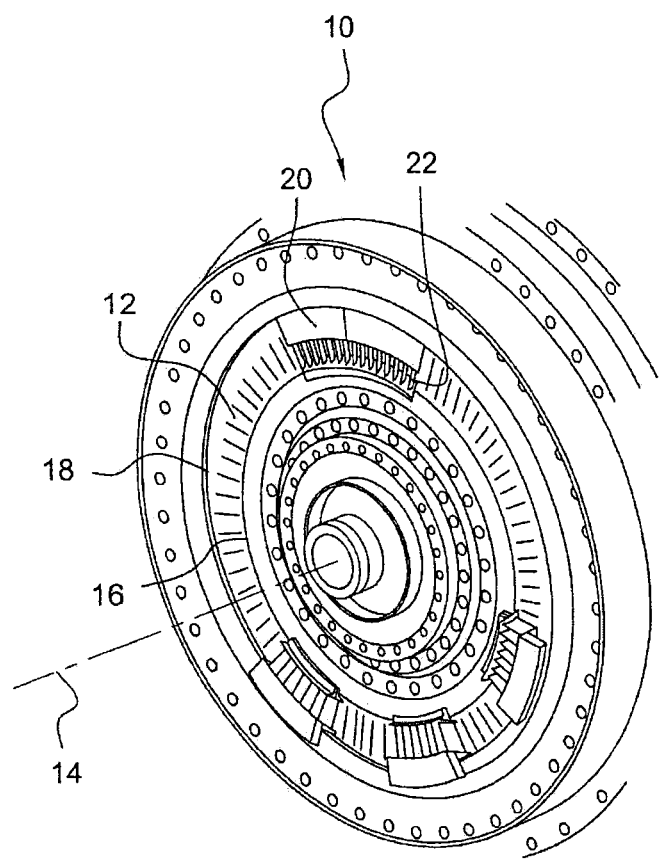
FIG. 1 is a perspective view of an exemplary turbine engine module, with a vane stage.

FIG. 1 thus shows a stage of a turbine engine 10, placed in a compressor or a turbine. An annular gas flow pattern 12 circulating a gas in the upstream to downstream direction extends circumferentially around and parallel to the axis 14 of the turbine engine, globally parallel to which the fluid operating the turbine engine circulates in the upstream to downstream direction. The gas flow pattern 12 is limited inside and outside by two respective annular walls 16, 18. One annular row of vanes 20 is mounted through the gas flow pattern. Each vane comprises (at least) one blade 22 which extends along a radial or longitudinal direction through the gas flow pattern 12 and interacting with the fluid.

As shown in other Figures (more particularly FIG. 2 or 4, and 5), a blade 22 comprises a lower surface 24 wall and an upper surface 26 wall, respectively, which form the limit thereof in a direction 90 on the periphery or on the side with respect to the axis 14. Such walls 24, 26 extend longitudinally through the gas flow pattern and join upstream so as to form the leading edge 28 of the blade, and downstream so as to form the trailing edge 30 of the blade. Depending on the stage where such vanes are mounted, the latter may be stationary or rotating in the gas flow pattern. The outside surface (jacket) 22a of the blade thus comprises the walls 24, 26 with the areas 28, 30.

In FIGS. 2 and 5, the vane 20, which may be called a vane block, here comprises two transversal respectively internal and external platforms 16a, 18a forming an angular sector, and a series of several successive blades 22 extending therebetween, radially to the axis 14. The succession of such transversal platforms around the axis 14 forms the annular walls 16, 18. In an alternative solution, a vane may comprise only one radial blade whereon two transversal platforms limiting the gas flow pattern may be fixed, on respectively internal and external spokes.

To study the flow of the fluid in the gas flow pattern 12, the blades 22 may advantageously be instrumented with data collecting means 32, more particularly when testing the turbine engine or a turbine engine module. Data may then be transmitted to a user for real time or deferred analyses. Such data may for instance be the temperature or the pressure of the fluid, or any other parameter which can be measured in the gas flow pattern.

FIG. 2 and the following ones show a possible application of the above-mentioned characteristics referring to a thin blade, i.e. with a low side thickness between the upper surface 26 or lower surface 24 walls. As shown in FIG. 4, the blade has, between the upper surface 26 or lower surface 24 walls, a thickness which is conventionally greater on the leading edge (e1 thickness) than on the trailing edge (e2). 31 additionally refers to the camber line of the blade, between the leading edge 28 and the trailing edge 30. One or more blade(s) may be equipped this way.

The (each) data collecting means 32 is adapted to enable collecting the desired data on the outer surface 22a of the blade 22 concerned, or in the close vicinity thereof (for instance in the boundary layer), on the side of at least one of the upper surface 26 or lower surface 24 walls.

It may more particularly comprise a tube, a nozzle, or an electric cable (or electronic equipment) for collecting data, making it possible to sample a fluid and/or collect data, for instance relating to the temperature or the pressure of the fluid flowing around the blade.

According to the advantageous solution mentioned above, the blade 22 comprises or includes the data routing channel 40 and has a groove 34 which leads to at least one of the upper surface 26 or lower surface 24 walls and communicates (is in fluid communication) with the channel 40.

Through the groove 34, the data collecting means 32 is connected to the data routing channel 40, and more particularly leads thereto or goes thereto or therethrough.

To prevent disturbances in the measuring taps, it is recommended that the groove 34 should be formed in one of the upper surface 26 or lower surface 24 wall opposite the one whereto the data collecting means 32 leads on (or close to) the outer surface of the blade.

An orifice 36 then extends through the blade 22, between the upper surface 26 and the lower surface 24, to lead to either side, and so that the data collecting means 32 extends therethrough (by extending through such orifice or by being in fluid communication therewith).

As the data collection is more particularly useful on the upper surface 26 side, the groove will preferably be formed in the lower surface 24.

In order to collect information downstream, close to the trailing edge, while preserving a correct blade structure, it is recommended that, from the leading edge 28 to the trailing edge 30, first the data routing channel 40, then the groove 34 and eventually the orifice 36, should be provided in this order in the blade. As shown in FIG. 4, the channel 40 and the groove 34 may thus be formed in an intermediary area thicker than the blade at the place where the orifice 36 is formed. Among the three elements, the channel(s) 40 will preferably be provided in the intermediate thickest area (including the channels which does not cooperate with a groove such as 34, since it is connected with data taps located not so far downstream.

As regards this issue, FIG. 4 shows that along the camber line 31, the data collecting means 32 (which is thus closer to the trailing edge 30) may advantageously be present, here with the orifice 36, in the third of such camber line which is closer to the trailing edge 30.

In the case, as shown in FIG. 4, where a tube 32 is used as the data collecting means, the tube may even be embedded if the ratio of the thickness (e3) of the blade 22 at the place (or location) of the orifice gone through by such tube 32 to the diameter (D3) of said tube is smaller than or equal to 1.5 or even smaller than or equal to 1, or still range between 0.4 and 0.8.

The tube may also be positioned close to the trailing edge or on thin blades.

FIG. 5 shows that the blade 22 has, between the transversal platforms 16a, 18a, a direction of extension 220, along the leading edge and the trailing edge. It also shows that the channel 40, together with the cable 32 which forms the data collecting means 32 here (with the "collection" including the transmission of such data to the associated processing means 38), provided therein, globally extend into the blade along such direction of extension 220. The channel 40, the groove 34 and the orifice 36 shall, a priori advantageously, be substantially perpendicular to one another.

Now, it will be possible to transfer the data collected laterally, close to the trailing edge 30 into the blade without significantly affecting the flow to be studied, and then to transmit such data, output from the vane away from the blade, to such means 38 (which will typically be remote).

The above-mentioned solution also makes it possible to easily and quickly position the data collecting means 32 while meeting the criteria for monitoring the formation of aerodynamic separations. Besides, such means having a small section, and being locally inserted into the blade and thus insignificantly affecting the flow (all the more so as it leads to the surface of the blade, without any protrusion into the gas flow pattern), induces very low aerodynamic disturbances on the side opposite the measuring tap.

Considering the above recommendations, if (at least) one tube is used as the data collecting means 32, it will be possible to conform it at best to the profile around the blade and more specifically to provide it with two successive curvatures 32a, 32b opposite each other (FIGS. 3, 4), outside the vane, on a blade side wherein the groove is formed.

As regards the design approach which has been chosen here, it should be understood that the issue is integrating the measuring (or the means transmitting it, such as the electric cable for temperature measuring) in the blade thickness, through channel 40, and this in the direction of the trailing edge 30, until a given criterion of the blade minimum thickness is reached.

Beyond this area, the groove 34, locally provided in the blade, makes it possible for the channel to lead to the side of the blade opposite the measuring tap, and thus to provide access for the inserted information collecting means 32, and this all the more discretely and minimizing the disturbances, if the tube is a pressure tube. The orifice 36 makes it possible to reach the upper surface, if need be, at the position desired for the measuring tap, close to the trailing edge.

As regards the production of the vane now, using laser melting is recommended to produce the vane 20, and then fixing the data collecting means 32, produced otherwise, to such vane is recommended too.

It is also recommended that such step of producing the vane using laser melting should preferably include the production, still using laser melting, of the data routing channel 40, the groove 34 which communicates therewith and/or the orifice 36 wherethrough the data collecting means 36 extends.

Therefore, in the case of a tube 34 as illustrated in FIGS. 2-4, the inserted tube 34 will be introduced at one end into the groove, and at the other end, into the orifice 36, and then it will be levered, on the measuring tap side, here, on the surface of the upper surface 26.

Such tube may be secured to the blade by reconditioning with Nichrome wire. This may be completed by a deposition of glue (in the case of a low temperature gas flow pattern) or SAUEREISEN™ cement (if the temperature is higher) around the tube to ensure perfect fixing and sealing.

The tube will advantageously be made of Inconel™, which has a low thermal inertia.

Turbines, compressors or turbine engine modules of an airplane, and more particularly turboshaft engines and jet prop engines are more particularly concerned to be equipped with at least one such vane.

It should be reminded that laser melting (or selective laser melting) is an additional production technology capable of producing metallic parts using high-powered lasers, progressively and locally (selectively) melting a metallic powder in a controlled atmosphere.

The invention claimed is:

1. A vane intended to be mounted in a supply fluid pattern, the vane comprising:
a blade delimited in a lateral direction by an outer surface having an upper surface wall and a lower surface wall which are joined at ends, so as to form there a leading edge and a trailing edge respectively, the blade housing a data routing channel and having a groove leading to at least one of the upper surface and lower surface walls and which communicates with the data routing channel, and
data collecting means for collecting data on one of the outer surface of the blade and the vicinity thereof, the data collecting means being connected, through the groove, to the data routing channel, or extending therethrough,
wherein the data collecting means comprises one of an inserted tube and a cable, and the groove is formed in one of the upper surface wall and the lower surface wall opposite that whereto said one of the inserted tube and the cable leads, and the blade wherein the blade comprises an orifice passing therethrough between the upper surface wall and the lower surface wall so that said one of the inserted tube and the cable extends therethrough.

2. A vane according to claim 1, wherein:
the blade has a thickness which is thicker at the leading edge than at the trailing edge, between the upper surface wall and the lower surface wall, respectively, and
the blade first has the data routing channel and then the groove, and finally said orifice, from the leading edge to the trailing edge.

3. A vane according to claim 1, wherein:
the blade has a camber line from the leading edge to the trailing edge, and
the data collecting means is present on one of the upper surface wall and the lower surface wall in the third of the camber line which is the closest to the trailing edge, along the camber line of the leading edge.

4. A vane according to claim 1, wherein:
one of the inserted tube is present on a blade side where the groove is formed and
a ratio between the thickness of the blade at the location of the orifice and the diameter of the inserted tube is smaller than or equal to 1.5.

5. A vane according to claim 4, wherein the ratio between the thickness of the blade at the location of the orifice and the diameter of the inserted tube is between 0.4 and 0.8.

6. A vane according to claim 1, wherein one of the inserted tube is present on a blade side where the groove is formed and said inserted tube has two curvatures reciprocal to one another, outside the vane.

7. A turbine comprising a vane according to claim 1.

8. A compressor comprising a vane according to claim 1.

9. A turbine engine module comprising a vane according to claim 1.

* * * * *